*US010109880B2*

United States Patent
Blanchet et al.

(10) Patent No.: US 10,109,880 B2
(45) Date of Patent: Oct. 23, 2018

(54) ELECTROCHEMICAL STACK COMPRESSION SYSTEM

(71) Applicant: Nuvera Fuel Cells, Inc., Billerica, MA (US)

(72) Inventors: Scott Blanchet, Chelmsford, MA (US); Edward Domit, Westford, MA (US); Duncan Lawrie, Girard, PA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 338 days.

(21) Appl. No.: 14/198,317

(22) Filed: Mar. 5, 2014

(65) Prior Publication Data

US 2014/0255817 A1    Sep. 11, 2014

Related U.S. Application Data

(60) Provisional application No. 61/775,068, filed on Mar. 8, 2013.

(51) Int. Cl.
| H01M 8/2475 | (2016.01) |
| H01M 8/248 | (2016.01) |
| C25B 1/12 | (2006.01) |
| C25B 9/20 | (2006.01) |

(52) U.S. Cl.
CPC ............. *H01M 8/2475* (2013.01); *C25B 1/12* (2013.01); *C25B 9/206* (2013.01); *H01M 8/248* (2013.01); *Y02E 60/366* (2013.01)

(58) Field of Classification Search
CPC ...................................................... H01M 8/24
See application file for complete search history.

(56) References Cited

U.S. PATENT DOCUMENTS

| 5,789,091 | A |  | 8/1998 | Wozniczka et al. |
| 5,993,987 | A |  | 11/1999 | Wozniczka et al. |
| 6,663,996 | B2 |  | 12/2003 | Gibb et al. |
| 6,862,801 | B2 |  | 3/2005 | Hill et al. |
| 2003/0072545 | A1 | * | 4/2003 | Kusakari .............. G02B 6/4432 385/101 |
| 2003/0209867 | A1 | * | 11/2003 | Weitgasser ............. A63C 17/02 280/11.27 |

(Continued)

FOREIGN PATENT DOCUMENTS

| CN | 102388496 A | 3/2012 |
| DE | 10 2006 030605 A1 | 1/2008 |

(Continued)

OTHER PUBLICATIONS

Translation of JP2004327125 (Year: 2018).*

(Continued)

*Primary Examiner* — Sarah A. Slifka
*Assistant Examiner* — Brian R Ohara
(74) *Attorney, Agent, or Firm* — Finnegan, Henderson, Farabow, Garrett & Dunner LLP

(57) ABSTRACT

In accordance with one embodiment, an electrochemical cell stack compression system may include an integral, hollow frame configured to contain a plurality of electrochemical cells arranged along an axis in a stack configuration. The frame may have a defined shape and may form a continuous border around a periphery of the electrochemical cell stack when inserted. The frame may be formed of a plurality of fibers.

10 Claims, 6 Drawing Sheets

(56) References Cited

U.S. PATENT DOCUMENTS

| | | | |
|---|---|---|---|
| 2006/0093890 A1 | 5/2006 | Steinbroner | |
| 2008/0241631 A1* | 10/2008 | Norimatsu | H01M 8/04208 429/446 |
| 2008/0305380 A1* | 12/2008 | Andreas-Schott | H01M 8/248 429/460 |
| 2009/0226794 A1* | 9/2009 | Kum | H01M 8/248 429/463 |
| 2010/0040921 A1* | 2/2010 | Aoto | H01M 8/2415 429/405 |
| 2011/0070474 A1* | 3/2011 | Lee | H01M 2/1077 429/120 |
| 2012/0251863 A1* | 10/2012 | Berger | H01M 2/1083 429/99 |
| 2013/0017469 A1 | 1/2013 | Hannesen | |

FOREIGN PATENT DOCUMENTS

| | | | |
|---|---|---|---|
| JP | H6-188023 A | | 7/1994 |
| JP | H9-022720 A | | 1/1997 |
| JP | 2001-504632 A | | 4/2001 |
| JP | 2002-63929 A | | 2/2002 |
| JP | 2004327125 A | * | 11/2004 |
| JP | 2008-527661 A | | 7/2008 |
| JP | 2009-212073 A | | 9/2009 |
| JP | 2012-520538 A | | 9/2012 |
| WO | WO 2008/089977 A1 | | 7/2008 |
| WO | WO 2010/102815 A1 | | 9/2010 |
| WO | WO 2013/008654 A1 | | 1/2013 |

OTHER PUBLICATIONS

PCT International Search Report and PCT Written Opinion of the International Searching Authority for corresponding PCT application PCT/US2014/017195, dated May 16, 2014, (11 pages total).
Examination Report issued in Australian Patent Application No. 2014226462, dated Apr. 26, 2017. (3 pages).
Examination Report issued in European Patent Application No. 14 709 057.5, dated Dec. 9, 2016. (7 pages).
First Office Action issued in Chinese Patent Application No. 201480012808.X, dated Feb. 4, 2017. (8 pages).
Notification of Reasons for Refusal issued in Japanese Patent Application No. 2015-561380, dated Dec. 18, 2017 (12 pages).
Chinese Second Office Action issued in Chinese Patent Application No. 201480012808X dated Feb. 27, 2018, with English translation (13 pages).
Notice of Acceptance for Australian Application No. 2014226462, dated Mar. 14, 2018 (3 pages).

* cited by examiner

ELECTROCHEMICAL STACK COMPRESSION SYSTEM

This patent application claims the benefit of priority under 35 U.S.C. § 120 to U.S. Provisional Patent Application No. 61/775,068, filed Mar. 8, 2013, which is incorporated herein by reference in its entirety.

Embodiments of the present disclosure relate to electrochemical cells, and more particularly, to systems for applying a compressive force to high differential pressure electrochemical cell stacks.

Electrochemical cells are used to generate an electric current from chemical reactions. Electrochemical cell technology, like fuel cells and hydrogen compressors, offers a promising alternative to traditional power sources, such as fossil fuels, for a range of technologies, including, for example, transportation vehicles, portable power supplies, and stationary power production. An electrochemical cell converts the chemical energy of a proton source (e.g., hydrogen, natural gas, methanol, gasoline, etc.) into electricity through a chemical reaction with oxygen or another oxidizing agent. The chemical reaction typically yields electricity, heat, and water.

A basic high differential pressure electrochemical cell comprises a negatively charged anode, a positively charged cathode, and an ion-conducting material called an electrolyte. Different electrochemical cell technologies utilize different electrolyte materials. A Proton Exchange Membrane (PEM) cell, for example, utilizes a polymeric, ion-conducting membrane as the electrolyte.

To generate electricity, a fuel, such as hydrogen gas, for example, may be delivered to an anode side of an electrochemical cell. Here, hydrogen may be split into positively charged protons and negatively charged electrons. The protons may then pass through an electrolyte membrane, such as a PEM, to a cathode side of the cell, The PEM may be configured to allow only the positively charged protons to pass through to the cathode side of the cell. The negatively charged electrons may be forced to pass through an external electric load circuit to reach the cathode side of the cell, and in doing so, may generate a usable electrical current. Oxygen may be delivered to the cathode side of the cell, where it may react with the protons and the electrons to form water molecules and heat as waste.

The cathode, electrolyte membrane, and anode of an individual electrochemical cell, may collectively form a "membrane electrode assembly" (MEA), which may be supported on both sides by bipolar plates. Gases, such as hydrogen and oxygen, may be supplied to the electrodes of the MEA through channels or grooves formed in the bipolar plates.

A single cell may generally produce a relatively small electrical potential, about 0.2-1 volt, depending on the current. To increase the total voltage output, individual electrochemical cells may be stacked together, typically in series, to form an electrochemical cell stack. The number of individual cells in a stack may depend on the application and the amount of output required from the stack for that application.

The electrochemical cell stack may receive flows of hydrogen and oxygen, which may be distributed to the individual cells. Proper operation of the cell stack may require the maintenance of effective seals between the individual cells, components of the cells, and flow conduits. Accordingly, the electrochemical cells in a stack may need to be compressed against one another to maintain sufficient electrical contact between the internal components of each cell. The amount of compression between the cells may affect the contact resistance, electrical conduction, and membrane porosity, and thus may affect the overall performance of the electrochemical cells. Accordingly, in order to maintain contact between the cells and increase performance, uniform compression is typically distributed over the electrochemical cell stack.

Often tie rods, bands, and/or springs may be used to apply compressive force to a cell stack. These compression mechanisms typically require the use of end plates located at both ends of the electrochemical cell stack. For example, end plates may cap each end of a cell stack, and tie rods may extend from one end plate to the other, either external to the stack along the periphery, or within the stack by passing through openings in the cells of the stack. The tie rods may be tightened or loosened to move the end plates towards or away from each other to adjust the amount of compression exerted on the stack. In some instances, bands may also be wrapped around the stack, stretching from end plate to end plate, to maintain compression. To withstand the compressive forces of tie rods and/or bands, thicker end plates and rods may be required to prevent bowing or cracking. This may increase the size and weight of the cell stack, as well as the cost of the electrochemical cell system. The problems of stack compression may be further complicated in high-pressure electrochemical cell stacks, because high-pressure operation may cause increased separation of the cells. Thus, a cost-effective, compact, and lightweight system of compression is needed. Further, a system is needed that is capable of maintaining compression in an electrochemical cell stack over an extended period of time and under a range of operating conditions.

The present disclosure is directed toward the design of improved compression systems for use with electrochemical cells. In particular, the present disclosure is directed towards the design of adjustable compression structures for use with electrochemical cells. Such devices may be used in electrochemical cells operating under high differential pressures, including, but not limited to hydrogen compressors, fuel cells, electrolysis cells, hydrogen purifiers, and hydrogen expanders.

Embodiments of the present disclosure are directed to a system for applying compressive force to electrochemical cell stacks.

In accordance with one embodiment, an electrochemical cell stack compression system may include an integral, hollow frame configured to contain a plurality of electrochemical cells arranged along an axis in a stack configuration, wherein the frame has a defined shape and forms a continuous border around a periphery of the electrochemical cell stack when inserted, and wherein the frame is formed of a plurality of fibers.

Various embodiments of the disclosure may include one or more of the following aspects: the frame may be formed of a plurality of fibers composed of different materials; the frame may include multiple layers formed of fibers; the frame may include a friction-reducing layer located between at least one of the multiple layers formed of fibers; the frame may include at least two opposing wall surfaces; the frame may be further configured to contain at least one end block located at an end region of the frame; the frame may be further configured to contain at least one compression mechanism configured to apply a compressive force to the electrochemical cell stack; the compression mechanism may include at least one gib; the compression mechanism may be configured to expand when heated; the compression mechanism may include one or more internal drive screws extending between two separate portions, wherein rotating the internal drive screws in one direction moves the two portions further away from each other and rotating the internal drive screws in the opposite direction moves the two portions closer to each other; and the frame may be configured to accommodate multiple different sizes of electrochemical cell stacks.

In accordance with another embodiment, an electrochemical stack compression system may include a structure having a defined shape that is configured to receive and contain a plurality of electrochemical cells arranged in a series along an axis to form an electrochemical stack and at least one compression mechanism configured to apply a compressive force to the electrochemical stack located adjacent to and along the axis of the electrochemical stack, wherein the structure forms a continuous border surrounding the electrochemical stack and the at least one compression mechanism when contained.

Various embodiments of the disclosure may include one or more of the following aspects: the compression mechanism may include at least one gib; the compression mechanism may include a block that is configured to expand in response to an increase in temperature; the compression mechanism may include internal drive screws configured to increase the size of the compression mechanism when the internal drive screws are rotated in a first direction and to decrease the size of the compression mechanism when the internal drive screws are rotated in a second direction opposite the first direction; the structure may be formed of wound fibers; the fibers may be non-conductive; the fibers may be carbon; and a height of the structure along the axis of the electrochemical stack may change in response to a load applied by the compression mechanism to the electrochemical stack when receiving the compression mechanism.

A method of preloading various embodiments of the disclosure may include inserting the electrochemical stack into the structure, inserting the at least one compression mechanism into the structure, configuring the compression mechanism to apply a predetermined load within the compression system, and measuring a change in height of the structure along the axis of the electrochemical stack to determine the load being applied by the compression mechanism.

Various embodiments of the method may further include: inserting at least one end block into the structure; the compression mechanism may include two gibs and configuring the compression mechanism may include wedging the two gibs against each other; configuring the compression mechanism may include increasing the temperature of the compression system to expand the compression mechanism; and configuring the compression mechanism includes rotating a plurality of internal drive screws to expand the compression mechanism.

In accordance with another embodiment of the present disclosure, an electrochemical stack compression system may include an integral, hollow structure having a defined shape and formed of a plurality of wound fibers; a plurality of electrochemical cells arranged in a series along an axis to form an electrochemical stack, wherein the electrochemical stack is contained within the structure; at least one end block contained within the structure and located at an end region of the structure; and at least one compression mechanism contained within the structure, wherein the at least one compression mechanism is configured to apply a compressive force to the electrochemical stack, and wherein the electrochemical stack, the at least one end block, and the at least one compression mechanism are contained in series within the structure such that the structure forms a continuous border around and adjacent to a periphery of the electrochemical stack, the at least one end block, and the at least one compression mechanism.

Various embodiments of the disclosure may include one or more of the following aspects: the fibers may be configured to stretch and contract in response to changes in the compressive force; the at least one compression mechanism may include a gib; and the at least one compression mechanism may be configured to expand.

Additional objects and advantages of the embodiments will be set forth in part in the description that follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure, and together with the description, serve to explain the principles of the disclosure.

Reference will now be made in detail to the exemplary embodiments of the present disclosure described below and illustrated in the accompanying drawings. Wherever possible, the same reference numbers will be used throughout the drawings to refer to same or like parts.

While the present disclosure is described herein with reference to illustrative embodiments of a PEM electrochemical cell employing hydrogen, oxygen, and water, it is understood that the devices and methods of the present disclosure may be employed with various types of electrochemical cells, including, but not limited to hydrogen compressors, fuel cells, electrolysis cells, hydrogen purifiers, and hydrogen expanders. Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Figure 1:
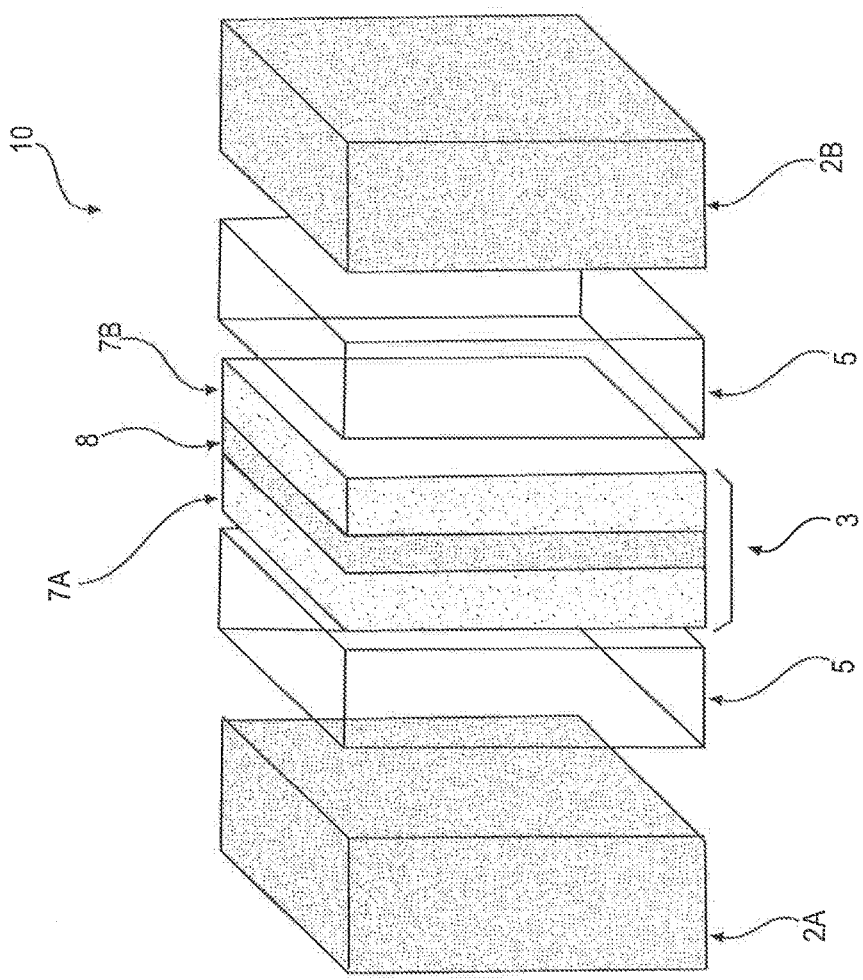
FIG. 1 illustrates an exploded view of an exemplary electrochemical cell, according to an embodiment of the present disclosure.

FIG. 1 depicts an individual electrochemical cell 10, according to an embodiment of the present disclosure. In the exploded side view shown in FIG. 1, cell 10 includes a central, electrolyte membrane 8. Electrolyte membrane 8 may be positioned between an anode 7A and a cathode 7B. Together, electrolyte membrane 8, anode 7A, and cathode 7B may form MEA 3. Hydrogen atoms supplied to anode 7A may be electrochemically split into electrons and protons. The electrons may flow through an electric circuit (not shown) to cathode 7B, generating electricity in the process, while the protons may pass through electrolyte membrane 8 to cathode 7B. At cathode 7B, protons may react with electrons and oxygen supplied to cathode 7B to produce water and heat.

Electrolyte membrane 8 may electrically insulate anode 7A from cathode 7B. Electrolyte membrane 8 may be any suitable membrane, including, e.g., a PEM membrane. Electrolyte membrane 8 may be formed of a pure polymer membrane or a composite membrane, which may include, e.g., silica, heteropolyacids, layered metal phosphates, phosphates, and zirconium phosphates, embedded in a polymer matrix. Electrolyte membrane 8 may be permeable to protons but may not conduct electrons. Anode 7A and cathode 7B may include porous carbon electrodes containing a catalyst. The catalyst material, e.g., platinum or any other suitable material, may speed up the reaction of oxygen and fuel.

The size and shape of MEA 3 may be increased or decreased depending on the application of cell 10 and the given load requirements. For example, the thickness, length, or width of MEA 3 may be adjusted according to the given application and requirements. Additionally, the concentration of catalyst material in anode 7A and cathode 7B may be adjusted according to the given application. The concentration of catalyst material in anode 7A and cathode 7B and the thickness of electrolyte membrane 8 may each affect the total thickness of MEA 3.

In some embodiments, electrochemical cell 10 may optionally include one or more electrically conductive flow structures 5 on each side of MEA 3. Flow structures 5 may serve as diffusion media enabling the transport of gases and liquids within cell 10. Flow structures 5 may also promote electrical conduction, aid in the removal of heat and water from electrochemical cell 10, and provide mechanical support to electrolyte membrane 8. Flow structures 5 may include, e.g., flow fields, gas diffusion layers (GDL), or any suitable combination thereof. Flow structures 5 may be formed of "frit"-type sintered metals, layered structures, e.g., screen packs and expanded metals, and three-dimensional porous substrates. An exemplary porous metallic substrate may consist of two distinct layers having different average pore sizes. Such flow structures 5 may be formed of any suitable material, including, e.g., metals or metal alloys, such as, e.g., stainless steel, titanium, aluminum, nickel, iron, and nickel-chrome alloys, or any combination thereof. In addition, flow structures 5 may include a suitable coating, such as a corrosion-resistant coating, like carbon, gold, or titanium-nitride.

The reactant gases on each side of the electrolyte membrane are often present at different pressures, e.g., operating pressures may range from approximately 0 psid to 15,000 psid, creating a pressure differential across MEA 3. For example, when an electrochemical cell is configured as a hydrogen compressor, the flow structure on the cathode side of the membrane is exposed to higher pressures than the flow structure on the anode side. The pressure differential may create a force on MEA 3 that causes MEA 3 to move away from the high pressure side toward the low pressure side. This movement may cause a reduction in contact pressure and separation of the contacting surface of MEA 3 from flow structures 5 on the high-pressure side. Reduction in pressure and subsequent separation between the contacting surfaces of MEA 3 and high-pressure flow structures 5 may reduce the electrical conduction and increase the contact resistance between the two, reducing the efficiency of electrochemical cell 10.

Flanking flow structures 5 and MEA 3, cell 10 may also include two bipolar plates 2A, 2B. Bipolar plate 2A may be positioned on the high-pressure side, and bipolar plate 2B may be positioned on the low-pressure side of electrochemical cell 10. Bipolar plates 2A, 2B may separate cell 10 from neighboring electrochemical cells (not shown) in a stack. In some embodiments, two adjacent cells in an electrochemical cell stack may share a common bipolar plate.

Bipolar plates 2A, 2B may act as current collectors, may provide access channels for the fuel and the oxidant to reach the respective electrode surfaces, and may provide channels for the removal of water formed during operation of electrochemical cell 10 by means of exhaust gas. Bipolar plates 2A, 2B may also provide access channels for cooling fluid, such as, e.g., water, glycol, or a combination thereof. Bipolar plates 2A, 2B may be made from aluminum, steel, stainless steel, titanium, copper, nickel-chrome alloy, graphite, or any other suitable electrically conductive material or combination of materials.

Figure 2A:
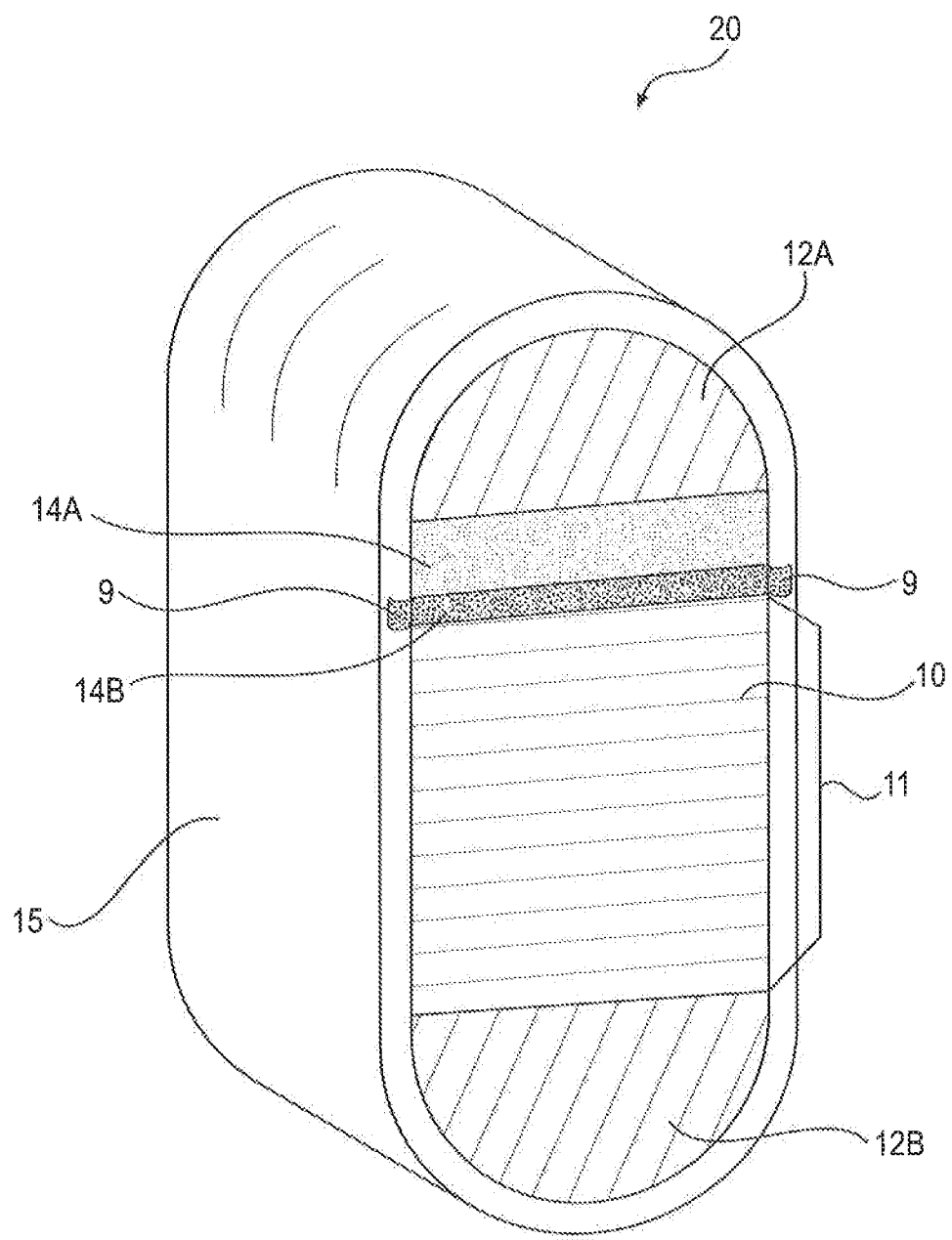
FIG. 2A illustrates an exemplary electrochemical cell compression system, according to an embodiment of the present disclosure.
Figure 2B:
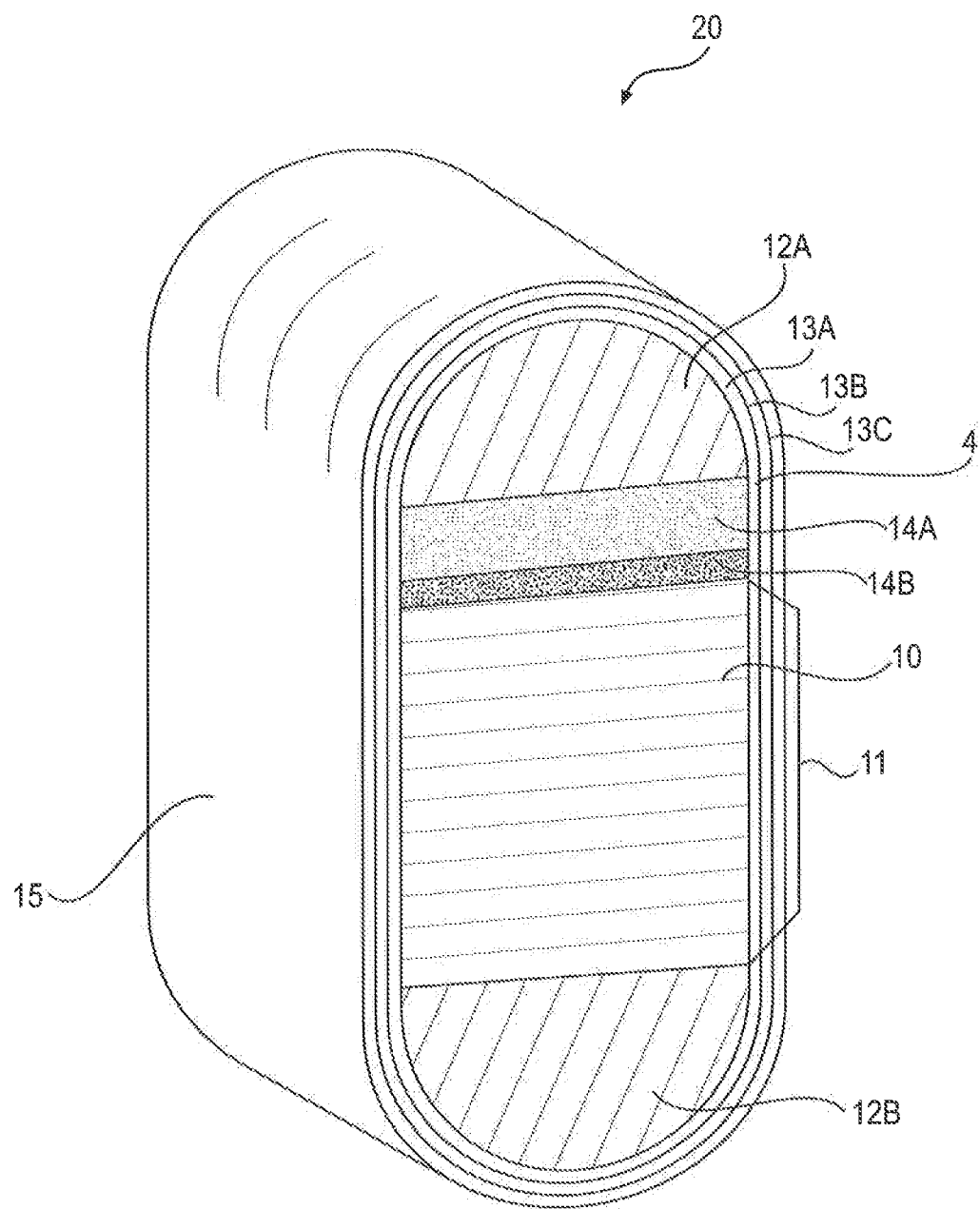
FIG. 2B illustrates an exemplary electrochemical cell compression system, according to an embodiment of the present disclosure.
Figure 2C:
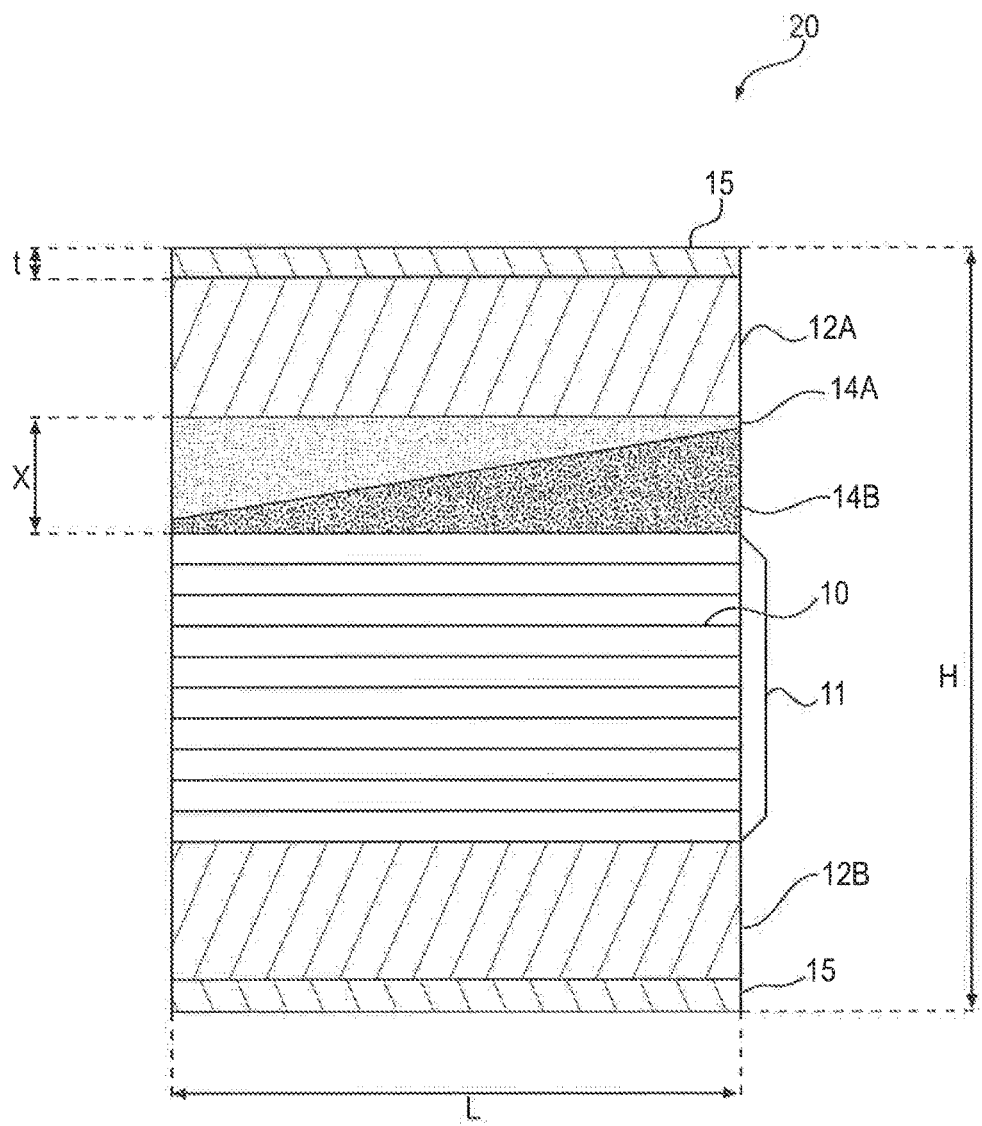
FIG. 2C illustrates a cross-section of the exemplary electrochemical cell compression system of FIG. 2A.

FIGS. 2A through 2C show exemplary electrochemical cell stack compression systems 20, according to embodiments of the present disclosure. Each individual cell 10 may be stacked within compression system 20 to form an electrochemical cell stack 11. Stack 11 may be comprised of any suitable number of cells 10. Stack 11 may be located between end blocks 12A and 12B, which may be located at each end of stack 11. End blocks 12A, 12B may be formed of any suitable metal, plastic, or ceramic material having adequate compressive strength, e.g., aluminum, steel, stainless steel, cast iron, titanium, polyvinyl chloride, polyethylene, polypropylene, nylon, polyether ether ketone, alumina, or any combination thereof.

Stack 11 and end blocks 12A, 12B may be housed in a structure 15. A wound fiber structure 15 may provide a resilient frame capable of housing a high-pressure electrochemical cell stack without significantly increasing the weight or size of the electrochemical cell system. Structure 15 may form a frame with a defined shape into which stack 11 and end blocks 12A, 12B are positioned. FIG. 2A depicts an elongated, rounded, structure 15, but structure 15 may be any suitable shape, including, e.g., rectangular, oval, circular, or square. The walls of structure 15 may form a continuous border long the periphery of stack 11 and end blocks 12A, 12B, and structure 15 and may or may not enclose the front and/or back portions of stack 11 and end blocks 12A, 12B. End books 12A, 12B, stack 11, and any other components housed in structure 15 may be configured to lie flush with the walls of structure 15 on an open face, or the components may be recessed within structure 15 or they may protrude from structure 15, or any suitable combination thereof.

Structure 15 may be dimensioned to house end blocks 12A, 12B and stack 11, which may include any suitable number of electrochemical cells 10. In some embodiments, the size, e.g., the height H, length L (shown in FIG. 2C), and/or width, of structure 15 may vary, for example, structure 15 may be configured to stretch during pre-loading, as discussed further below. Structure 15 may be dimensioned so as to snugly fit the desired contents, for example, electrochemical stack 11 and end blocks 12A, 12B, so as to not substantially increase the size of the overall electrochemical cell system.

In some embodiments, structure 15 may be formed of wound fibers that are capable of stretching and contracting. For example, structure 15 may be formed of wound fibers, such as, e.g., carbon, glass, or aramid (e.g., KEVLAR®) fibers. The fibers may be non-conductive to reduce the likelihood of short-circuiting stack 11. In some embodiments, structure 15 may be formed of metallic fibers, such as, e.g., steel, stainless steel, or aluminum, or alloys, such as Inconel. Structure 15 may be formed of homogenous fibers or a mixture of different fibers. Additionally, structure 15 may be formed with or without an epoxy matrix or other suitable material to bind the fibers together. As is shown in FIG. 2C, the walls of structure 15 may have a thickness 't.' The wound fiber material properties, such as, e.g., tensile strength, and wall thickness t may be selected to achieve a desired compressive force on stack 11. The fibers making up structure 15 may be wound together to form one integral frame unit into which stack 11 and various other components fit.

In some embodiments, such as the one shown in FIG. 2B, structure 15 may be formed of multiple layers 13A, 13B, and 13C. Though FIG. 2B depicts 3 layers, multi-layered embodiments of structure 15 may include any suitable number of layers. Each layer may be formed of homogenous fibers or of a combination of different fibers. The layers may be attached to one another, via, e.g., bonding or fastening mechanisms, or may be unattached and held together through, e.g., friction. Additionally, some layers may be attached while other layers may be unattached. In the multi-layer embodiments, structure 15 may include one or more slip-planes 4 between the layers. Slip-plane 4 may be formed of a separate layer or of a coating on one of the layers, such as, e.g., a polytetrafluoroethylene (e.g., TEFLON®), polyetheretherketone, polyimide, nylon, polyethylene, or polymer layer or coating, or any other suitable friction-reducing material to decrease the friction between the layers. If incorporated, slip-plane 4 may be included between each layer or may be included between fewer than all of the layers. The inclusion of slip-plane 4 may reduce the amount of stress within structure 15 and compression system 20, particularly in embodiments having thicker structure walls.

In some embodiments, end blocks 12A, 12B may be also be configured to fit into structure 15 so that one or both of end blocks 12A, 12B may move within structure 15. For example, end blocks 12A, 12B may be allowed to slip along the walls of structure 15. This configuration may decrease the stress in structure 15, which may in turn allow for structure 15 to incorporate thinner walls. In such embodiments, end blocks 12A, 12B may include a suitable friction reducing material or coating, e.g., polytetrafluoroethylene (e.g., TEFLON®), polyetheretherketone, polyimide, nylon, polyethylene. In other embodiments, end blocks 12A, 12B may be attached to the walls of structure 15 or may be otherwise configured so that end blocks 12A, 12B may not slip once inserted into structure 15.

According to another aspect of the disclosure, compression system 20 may include one or more gibs to promote uniform compression of electrochemical stack 11 within structure 15. The gibs may act as a wedge to drive two parallel planes in structure 15 apart as the gibs are wedged together in a direction perpendicular to the two parallel planes. For example, as shown in FIGS. 2A through 2C, gibs 14A, 14B may be inserted between electrochemical cell stack 11 and end block 12A to drive stack 11 and end block 12A apart while maintaining their parallel orientation. Gib 14B may have a flat surface and an opposite, angled surface. Gib 14B may be inserted into structure 15 so that the flat surface lies adjacent to stack 11 and the angled surface faces upwards. Gib 14B may be oriented so that the upward-facing, angled surface slopes in a downward direction toward the front face of structure 15 being loaded. Gib 14A may then be inserted next to gib 14B, and the two gibs may be driven together. Gib 14A may also have a flat surface and an opposite, angled surface sloped at an angle complimentary to the sloped surface of gib 14B. The angled surface of gib 14A may be inserted adjacent the angled surface of gib 14B so that the angled surface also slopes in downward direction towards the front face of structure 15. Thus, as gib 14A is inserted into structure 15 and driven against 14B, the complimentary slopes may slide against each other, pushing the flat surfaces of gibs 14A, 14B further apart from each other and towards end block 12A and stack 11. Gib 14A may be inserted into structure 15 until a desired compressive force is exerted on stack 11.

Gib 14B may also include a grip portion configured to aid in the insertion and removal of gibs 14A, 14B from structure 15. In some embodiments, gib 14B may include one or more gripping mechanism configured to engage the walls of structure 15 to reduce movement of gib 14B as gib 14A is inserted. The gripping mechanisms of gib 14B may engage an inner surface of structure 15 or may extend from gib 14B and engage an edge and/or outer surface of structure 15. For example, FIG. 2A depicts hooks 9 protruding outwards from gib 14B and engaging the edges of opposite walls of structure 15. Hooks 9 may prevent gib 14B from sliding further into structure 15 as gib 14A is inserted. Gib 14B may include any suitable gripping mechanism or combination of gripping mechanisms, such as, e.g., protrusions like pegs or hooks, or textured surfaces to reduce movement as gib 14A is wedged against gib 14B. The gripping mechanisms may be any suitable size, shape, and orientation. In some embodiments, the thick end of gib 14B may be constrained against a fixed surface as gib 14A is driven, preventing translation against cell stack 11.

While two gibs 14A, 14B are depicted, any suitable number of gibs may be included in compression system 20. Additionally, gibs 14A, 14B may be included in any suitable position, for example, gibs 14A, 14B may be positioned between stack 11 and end block 12B, or sets of gibs may be located on either side of stack 11.

Gibs 14A, 14B may be formed of any suitable material, such as, e.g., steel, stainless steel, ceramic, or aluminum. Gibs 14A, 14B may also have any suitable coating, such as a lubricant, to reduce galling or to facilitate insertion into compression system 20. Such a suitable friction reducing material may include, e.g., polytetrafluoroethylene (e.g., TEFLON®), polyetheretherketone, polyimide, nylon, polyethylene, or other lubricious polymer coatings, or any other suitable material.

Gibs 14A, 14B may be any suitable shape and size for insertion into structure 15. For example, in some embodiments, the size and shape of gibs 14A, 14B may at least in part reflect the size and shape of the interior region of structure 15. Gibs 14A, 14B may be designed with any suitable angle. The angle that gibs 14A, 14B are designed with may be based, at least in part, on the required pre-load of stack 11, which may be based on the application of stack 11 and the accompanying output requirements. The size and shape of gibs 14A, 14B may also be based, in part, on the size of stack 11 compared to the size of structure 15. For example, the same size structure 15 may be used to house stacks 11 of different sizes. Thus, larger gibs 14A, 14B may be used with smaller stacks 11 to apply an appropriate compressive force, and vice versa.

Gibs 14A, 14B may be used to apply compression to stack 11, maintain a uniform load, stabilize system 20, and provide planarity. During assembly, components of compression system 20, such as stack 11 and end blocks 12A, 12B may be inserted into structure 15. At this time, structure 15 may be "pre-loaded" or pre-stretched to apply a predetermined compressive force to stack 11 in order to maintain contact between electrochemical cells 10. This may be accomplished using compressive mechanisms, such as gibs 14A, 14B. Once the other components are inserted, gibs 14A, 14B may be inserted into structure 15 to fill any gaps. Gibs 14A, 14B may be wedged against each other until their parallel surfaces are forced apart far enough to achieve a desired compressive load on the surrounding components, e.g., stack 11, within structure 15. As gibs 14A, 14B are driven together during pre-loading, tension within the walls of wound fiber structure 15 may increase, and the fibers may stretch. This may increase the height H of structure 15. The amount of expansion of structure 15 may depend, at least in part, on the wall thickness t and the types of fibers that make up structure 15. Measuring the change in height H of structure 15 during pre-loading may indicate the compressive force being applied to stack 11 and may allow for more precise control of pre-loading conditions. Thus, when wound fiber structure 15 is used in conjunction with the disclosed compression mechanisms, system 20 may provide a lightweight, low-cost system for accurately and effectively applying a compressive load to stack 11.

During operation, as gas pressure in the stack increases, the compressive loading on stack 11 may decrease until cells 10 separate. At this point, structure 15 may begin to stretch more than its pre-loaded value. Thus, if stack 11 heats up more than structure 15 during operation, structure 15 may be forced to stretch more than the pre-loaded value due to differential thermal expansion and the force applied to the stack will increase. Thus, the materials of structure 15 and any compressive mechanisms may be selected based on their thermal properties to reduce the potential for loss of compressive force during operation.

Figure 3A:
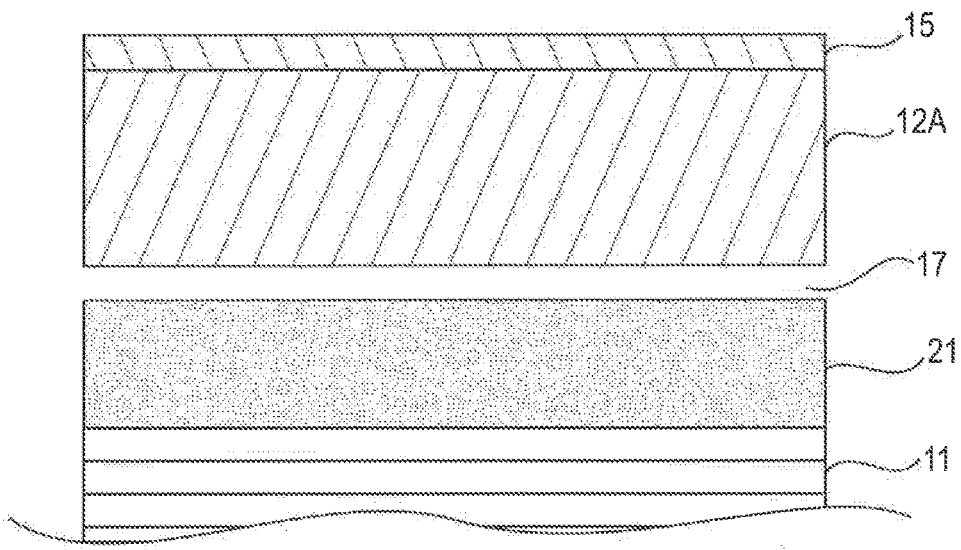
FIG. 3A illustrates an exemplary compression mechanism for an electrochemical cell compression system according to an exemplary embodiment of the present disclosure.
Figure 3B:
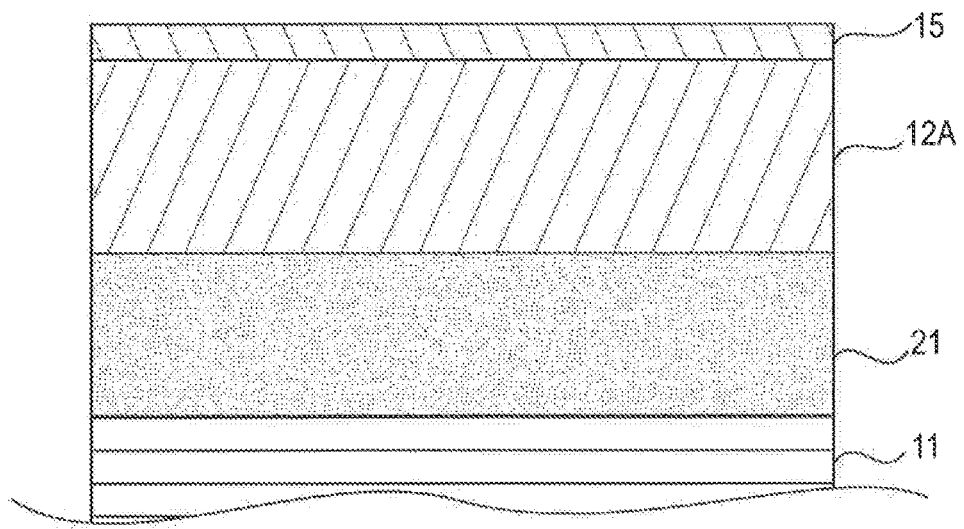
FIG. 3B illustrates an alternative view of the exemplary compression mechanism of FIG. 3A.

In some embodiments, system 20 may include other compressive mechanisms instead of, or in addition to, gibs 14A, 14B. For example, as is shown in FIGS. 3A and 3B, in some embodiments, one or more thermal expansion blocks 21 may be used to apply compression to stack 11. Block 21 may be cooled to a temperature below that of stack 11. During pre-loading, cooled block 21 may be inserted into compression system 20. As the temperature of block 21 increases inside of structure 15, block 21 may expand, and accordingly, may apply compression to stack 11. Block 21 may be formed of any material or combination of materials having suitable thermal expansion characteristics, such as, e.g., suitable metals, metal alloys, or ceramics. In some embodiments, block 21 may be formed of materials with a higher coefficient of thermal expansion than that of structure 15. In such embodiments, as stack 11 and block 21 are brought up to operating temperature (generally between 30 and 100° C.), block 21 may expand more than structure 15. Such expansion may result in compressive loading of stack 11.

One advantage of thermally activated compression mechanisms is that block 21 may be easier to insert into structure 15. Inserting block 21 prior to thermal expansion may reduce the wear and stress on the surrounding components of compression system 20. For example, as is shown in FIG. 3A, when block 21 is initially inserted during pre-loading, a gap 17 may exist in compression system 20. As block 21 warms, gap 17 may disappear as block 21 expands and fills the surrounding space (shown in FIG. 3B). Once gap 17 disappears, the continued expansion of block 21 may begin to compress stack 11 and apply a compressive load. The thermal properties of block 21 may be chosen to impart a desired compressive load based on the size of stack 11 and the size of gap 17 in structure 15. It will be understood that while gap 17 is shown between inserted block 21 and end block 12A, block 21 may be oriented so that gap 17 occurs on either side of block 21, or on both sides of block 21. Further, gap 17 may occur in any region within structure 15.

While block 21 is herein described as the expansion member, one or more of end blocks 12A or 12B may be designed to provide thermal compression instead of, or in addition to, block 21. Further, gibs 14A, 14B may also be made of suitable material to allow them to apply compression via use as a wedge as well as through thermal expansion. Additionally, multiple thermal expansion blocks 21 may be used, or a combination of thermal expansion block 21 and gibs 14A, 14B may be inserted into structure 15.

Figure 4:
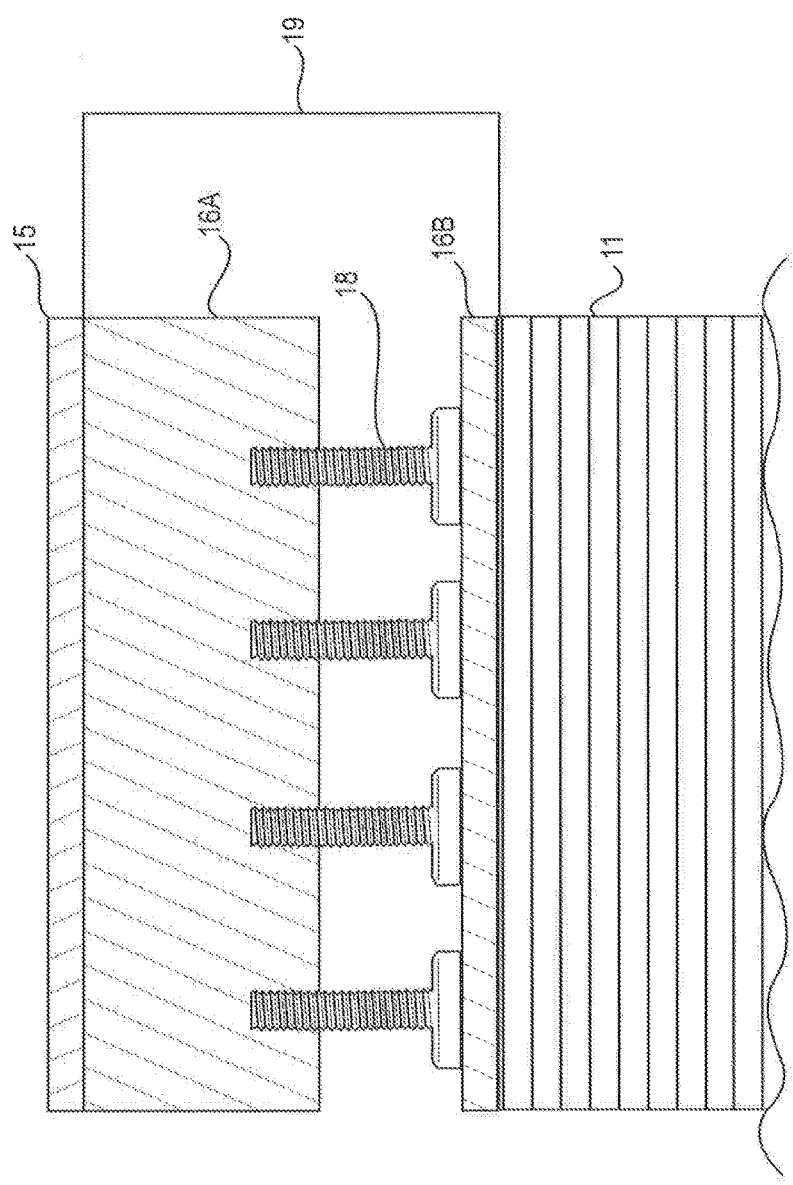
FIG. 4 illustrates an exemplary compression mechanism for an electrochemical cell compression system according to an exemplary embodiment of the present disclosure.

Other embodiments of the present disclosure may include still other compression mechanisms. As shown in FIG. 4, a screw compression unit 19 with internal drive screws may be used to apply a compressive load. Compression unit 19 may be configured to be removable from structure 15 or may be attached to structure 15. As is shown in FIG. 4, threaded screws 18 may extend from a base 16B of compression unit 19. The opposite ends of screws 18 may extend into complimentary threaded inlets (not shown) in block 16A of compression unit 19. Rotating screws 18 in one direction may cause screws 18 to screw further into the threaded inlets in block 16A, moving block 16A closer to base 16B and decreasing the gap between 16A and 16B. Decreasing the gap between 16A and 16B may reduce the compressive force applied to stack 11. Rotating screws 18 in the opposite direction may cause screws 18 to unscrew from the threaded inlets in block 16A, moving block 16A away from base 16B and increasing the gap between 16A and 16B. Increasing the gap between 16A and 16B may increase the compressive force applied to stack 11. During pre-loading, compression unit 19 may be inserted into structure 15 while there is little or no gap between block 16A and base 16B. Once inserted, screws 18 may be rotated so as to increase the gap between block 16A and base 16B in order to apply a desired compressive force to stack 11.

While four screws 18 are depicted in FIG. 4, any suitable number of threaded components may be included in compression unit 19. Additionally, the threaded components may be distributed on base 16B in any suitable arrangement. Screws 18 may be any suitable shape or size and may be formed of any suitable material, for example, any metal, metal alloy, or ceramic. Any number of compression units 19 may be incorporated in system 20, and compression unit 19 may be used in place of or in addition to either or both of gibs 14A, 14B and thermal expansion block 21. Further, in some embodiments, compression unit 19 may also be incorporated into one of the components or compression mechanisms described previously. For example, one or more of end blocks 12A, 12B, gibs 14A, 14B, or block 21 may include internal drive screws.

One additional advantage of some of the embodiments of disclosed compression system 20 (aside from the reduction in overall stack size and weight) is that compression system 20 may accommodate electrochemical stacks of different sizes. By incorporating gibs 14A, 14B, thermal expansion block 21, and/or compression unit 19, structure 15 may be configured to receive electrochemical cell stacks of different sizes with different numbers of electrochemical cells suitable for different applications and output levels. If a smaller stack 11 with fewer electrochemical cells 10 is contained in structure 15, then larger compression mechanisms or a larger number of or combination of compression mechanisms may be inserted around stack 11 during pre-loading to fill any additional space and apply a desired compressive force. Alternatively, if a larger electrochemical cell stack 11 with more cells 10 is housed in structure 15, smaller compression mechanisms or fewer compression mechanisms may be inserted around stack 11. Accordingly, the same basic structure 15 may be capable of housing different sized electrochemical cell stacks appropriate for different applications and different output levels. This may reduce manufacturing costs, because one standard structure 15 may be produced for housing a variety of electrochemical cell stack sizes suitable for a variety of applications. Thus, the same basic technology may produce structures for stacks of various cell counts and sizes. By incorporating different numbers of or different types of compression mechanisms described above, the same structure 15 may be capable of accommodating a range of operating conditions over an extended period of time.

Additionally, the wall thickness of structure 15 and the types of fibers selected to form structure 15 may allow structure 15 to accommodate a range of electrochemical cell stack sizes. Further, in multi-layer embodiments of structure 15, structure 15 may be configured so that one or more of the layers is removable or separable from the other layers. For example, one or more of the layers may be nested within another layer and may be capable of being completely removed from the surrounding layer. In an embodiment like that shown in FIG. 2B, layer 13A may be nested within and removable from layer 13B, for example, and slip-plane 4 may facilitate removal. Depending on the size of electrochemical cell stack 11 to be inserted into structure 15, one or more layers may be removed to adapt structure 15 to the currently applicable operating conditions.

Application of embodiments described above may improve performance of electrochemical cells, including electrochemical cells operating under high-pressure conditions.

The many features and advantages of the present disclosure are apparent from the detailed specification, and thus, it is intended by the appended claims to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. An electrochemical cell stack compression system comprising:
    an integral, hollow frame that defines a cavity configured to contain a plurality of electrochemical cells arranged in a stack along an axis of the hollow frame, wherein the entire stack is configured to be contained within the cavity,
    a pair of end blocks configured to be positioned at opposite ends of the stack,
    a compression mechanism contained within the frame configured to apply a compressive force to the stack, wherein the compression mechanism includes a first gib and a second gib inserted between the stack and an end block, the first and second gibs each having a flat surface and an opposite, angled surface, the flat surface of the first gib lies adjacent the stack, and the angled surface of the second gib is sloped at an angle complimentary to the angled surface of the first gib and is inserted adjacent the angled surface of said first gib,
    wherein the frame has a defined shape and forms a continuous border around a periphery of the electrochemical cell stack when contained within the frame, and
    wherein the frame is formed of a plurality of fibers.

2. The compression system of claim 1, wherein the plurality of fibers are composed of a plurality of different materials.

3. The compression system of claim 1, wherein the frame includes multiple layers.

4. The compression system of claim 3, wherein the frame includes a friction-reducing layer located adjacent at least one of the multiple layers.

5. The compression system of claim 1, wherein the frame includes at least two opposing wall surfaces that form at least a portion of the continuous border.

6. The compression system of claim 1, wherein the compression mechanism is configured to expand in response to an increase in temperature.

7. The compression system of claim 1, wherein the compression mechanism includes one or more internal drive screws extending between two separate portions, wherein rotating the internal drive screws in a first direction moves the two separate portions further away from each other and rotating the internal drive screws in a second direction moves the two separate portions closer to each other.

8. The compression system of claim 1, wherein the first or second gib includes one or more gripping mechanisms configured to engage the wall of the frame.

9. The compression system of claim 8, wherein the gripping mechanism includes hooks protruding from the first or second gib configured to engage the frame.

10. The compression system of claim 1, wherein the first and second gibs are located on either side of the stack.

* * * * *